United States Patent
Emerson et al.

(10) Patent No.: US 6,353,914 B1
(45) Date of Patent: Mar. 5, 2002

(54) PREAMP WRITER FAULT DETECTION CIRCUIT

(75) Inventors: Paul Merle Emerson, Murphy; Kenneth James Maggio, Dallas, both of TX (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 09/282,110

(22) Filed: Mar. 31, 1999

Related U.S. Application Data

(60) Provisional application No. 60/080,338, filed on Apr. 1, 1998.

(51) Int. Cl.[7] .................................................. G06F 11/00
(52) U.S. Cl. ........................ 714/799; 714/819; 340/661
(58) Field of Search ................................. 714/799, 811, 714/819, 798; 340/635, 661, 657

(56) References Cited

U.S. PATENT DOCUMENTS 4,570,082 A * 2/1986 Maley et al. ............... 327/205
5,729,208 A   3/1998 Ogiwara .................... 340/635
5,986,830 A * 11/1999 Hein ........................... 360/45

* cited by examiner

Primary Examiner—Christine T. Tu
(74) Attorney, Agent, or Firm—Pedro P. Hernandez; W. James Brady, III; Frederick J. Telecky, Jr.

(57) ABSTRACT

A open circuit detection circuit for a hard disk drive write head, wherein the write head receives write drive signals from a write driver, and wherein the write driver generates a write drive signal in response to write control signals. The circuit includes a pulse width detector, generating a latch control signal in response to the detection of a write control signal having a predetermined duration. The circuit also includes a comparator comparing the write drive signal to a predetermined reference level and generating a comparison output signal indicative of whether the write driver signal is more or less than the predetermined level. A latch is coupled to receive the comparison output signal, the latch being clocked in response to the latch control signals. The latch output provides an indication of an open circuit.

7 Claims, 4 Drawing Sheets

PREAMP WRITER FAULT DETECTION CIRCUIT

This application claims priority under 35 U.S.C. § 119 (e)(1) of provisional application number 60/080,338 filed Apr.1, 1998.

TECHNICAL FIELD OF THE INVENTION

This invention relates to hard drive circuitry, and more particularly relates to an apparatus for detecting an open circuit in a head write driver circuit.

BACKGROUND OF THE INVENTION

Computer hard drive storage units are part of most computer systems. These units include a magnetic head that is maintained at a very small distance from, and directed across the surface of a rotating magnetic disk. The head is controlled to write data to, and read data from the disk. FIG. 1 is a high level diagram showing basic elements of a typical hard drive unit 10. A magnetic disk 12 spins on a spindle 14. An arm 16 is controllably moved about a pivot 18. The resulting movement causes a magnetic head 22, which is maintained a small distance from the surface of disk 12, to move across the disk 12 as shown by arrow 20. Differential data signals are provided on input lines 24 and 26 to hard drive circuitry 28. Included in hard drive circuitry 28 is write drive circuitry 30. Write drive signals are provided from write drive circuitry 30 on lines 32 and 34 to arm 16, where they are conveyed to magnetic head 22.

In write operations, differential signals of alternating polarity are provided via lines 32 and 34 to magnetic head 22 so as to magnetize disk 12 in a pattern representing data to be stored in the unit.

When wire 32 and/or wire 34 breaks, an open circuit condition results that prevents data from being written to disk 12. Obviously, this is undesirable, and as a result fault detection circuits have been devised for detecting such open circuit conditions, so that the user of the hard drive may be alerted to this situation. Such fault detection circuits are typically integrated into the write drive circuitry 30. One such fault detection circuit is disclosed in U.S. Pat. No. 5,729,208, which issued on Mar. 17, 1998, to Hisao Ogiwara, which is assigned to Texas Instruments Incorporated, and which is hereby incorporated by reference. FIG. 2 shows a prior art write drive circuit 30 including a fault detection circuit embodying principles from that patent. FIG. 3 is a signal timing diagram of certain signals used and generated by the circuit of FIG. 2.

Briefly, referring to both FIGS. 2 and 3, differential write data signals $D_x$ and $D_y$, at positive supply emitter coupled logic ("PECL") levels are provided on lines 42 and 44, respectively, and are converted to complementary metal oxide semiconductor ("CMOS") levels in converter 46. The resulting level-adjusted data signals are inverted by inverters 48 and 50, respectively, and the resulting inverted data signals are provided as inputs to a write driver 52 and to a CMOS to PECL level converter 54. The reconverted data signal outputs of converter 54 are used as complementary phase control signals $\phi$ and $\bar{\phi}$, respectively. The outputs of write driver 52, 32 and 34, carry the write driver signals $H_X$ and $H_Y$, respectively, provided to the hard drive head 22 (FIG. 1). In FIG. 2 hard drive head 22 is not shown. However, the inductance $L_{HEAD}$ 56 seen electrically by the write driver 52 is shown, as it is significant to a discussion of some of the signals shown in FIG. 3, as will be made clear below.

Line 32 is provided to one input of a first comparator 58, and line 34 is provided to one input of a second comparator 60. The other inputs of both comparators 58 and 60 are connected by a line 59 to the source 62 of a reference voltage $V_{th}$ used to set the thresholds of comparators 58 and 60.

The differential outputs of comparator 58, carrying signals $C_X$ and $\overline{C_X}$, are provided to the differential inputs of a latch 64. The differential clock inputs CK and $\overline{CK}$ of latch 64 receive control signals $\bar{\phi}$ and $\phi$, respectively. The differential outputs of latch 62, A and $\overline{A}$, are provided to two inputs of a 4-input multiplexer 66.

The differential outputs of comparator 60, carrying signals $C_Y$ and $\overline{C_Y}$, are provided to the differential inputs of a latch 68. The differential clock inputs CK and $\overline{CK}$ of latch 68 receive control signals $\bar{\phi}$ and $\phi$, respectively. The differential outputs of latch 68, B and $\overline{B}$, are provided to the other two inputs of 4-input multiplexer 66. Multiplexer 66 receives control signals $\phi$ and $\bar{\phi}$ at the select input thereof.

The differential output of multiplexer 66 is provided to a PECL to CMOS level converter 70, the output of which is a WRITE OPEN indication signal.

Referring now additionally to FIG. 3, the write drive circuit 30 of FIG. 2 operates as follows. Write data $D_X$ and $D_Y$ are logical opposites of one another, where one is high and the other low, and vice versa. $D_X$ and $D_Y$ are converted to ECL levels by converter 46 into control signals $\phi$ and $\bar{\phi}$ to be used to clock the latches 64 and 68 and multiplexer circuit 66. Write driver 52 then generates signals $H_X$ and $H_Y$ from the write data, exemplary waveforms of which are shown in FIG. 3. Comparator 58 compares signal $H_X$ with reference voltage $V_{th}$, and generates differential output signals, signals $C_X$ and $\overline{C_X}$. Comparator 60 compares signal $H_Y$ with reference voltage $V_{th}$, and generates differential output signals, signals $\overline{C_Y}$ and $C_Y$. The reference voltage $V_{th}$ may be chosen to be a little higher than the saturation voltage of the comparators 58 and 60, which is between one and four volts. Signals $C_X$ and $\overline{C_X}$ are latched by latch 64, and signals $C_Y$ and $\overline{C_Y}$ are latched by latch 68, with control signals $\phi$ and $\bar{\phi}$ serving as clock signals. In other words, the write driver data $H_X$ and $H_Y$ are latched just before their predetermined polarity change by using, essentially, the rising edges of $D_X$ and $D_Y$ as latch clocks.

It will be appreciated that during normal operation, the latch output signals, A and B, are always high or at logic level "one." This is because the signals $C_X$ and $C_Y$ are always latched at a logic "one," as a consequence of the "rebound" action of inductance $L_{HEAD}$ on the signals $H_X$ and $H_Y$. Thus, the WRITE OPEN signal is always high. However, if an open circuit condition occurs, as at time 80 in FIG. 3, the inductance $L_{HEAD}$ no longer operates on the signals $H_X$ and $H_Y$, and their waveform simply tracks that of $D_X$ and $D_Y$. Consequently a "zero" is latched in one of latches 64 and 68, in this case a "zero" level of signal $C_X$ being first latched in latch 64, and the WRITE OPEN signal goes to zero and remains there.

The foregoing solution has provided very good fault detection operation. However, as data rates of hard drives have increased with the advance of technology, certain problems have arisen in the operation of fault detection circuits like that circuit 30. Specifically, faults have been indicated when none exist, resulting in an incorrect determination of a failed hard drive unit.

How these faults occur can be better understood by reference to FIG. 4 and FIG. 5, which help illustrate two ways in which the circuit of FIG. 2 generates false fault indications. FIG. 4 shows two of the signals shown in FIG.

3, namely $D_X$ and $H_X$, when the circuit 30 of FIG. 2 is operated at a high data rate typical for current hard drives. Note that the high level excursions, e.g., 90, and low level excursions, e.g., 92, of the data pules of $D_X$ are not of equal duration. After a relatively longer low excursion 94, at time 96, which is the occasion of a state latch in latch 64 (FIG. 2), it can be seen that at the level of $H_X$ has rebounded to a sufficiently positive level over the threshold level 98, for the reasons set forth above, so as to latch a "one" in latch 64, resulting in a WRITE OPEN level indicating no fault. However, at time 100, after a relatively short low excursion 102, the level of HX has not yet rebounded to a level above the threshold level 98. As a result, a "zero" is latched in latch 64, causing the WRITE OPEN level to indicate a fault, even though no fault exists.

Another cause of false fault indications can be understood by reference to FIG. 5, which shows a portion of the circuit 30 of FIG. 2, with the circuit of comparator 58 shown in detail. It can be seen that line 32 from write driver 52, carrying drive signal $H_X$, is connected to the base of an NPN bipolar transistor 110 in comparator 58. Line 32 is also connected to one end of the head inductance $L_{HEAD}$ 56, the other end of which is connected to line 34 from write driver 52, carrying drive signal $H_Y$. The emitter of bipolar transistor 110 is connected to one terminal of a current source 112, the other terminal of which is connected to ground. The emitter of bipolar transistor 110 is also connected to the emitter of a second NPN bipolar transistor 114. The common connection point of the emitter of bipolar transistor 110, the emitter of bipolar transistor 114, and of the connection terminal of current source 112 is node N1. The base of bipolar transistor 114 is connected by line 59 to source 62 of reference voltage $V_{th}$. The collector of bipolar transistor 112 is connected via resistor 116 to $V_{CC}$, and to a line 118 carrying the signal $\overline{C_X}$ as an output of comparator 58 to latch 64. The collector of bipolar transistor 114 is connected via resistor 120 to $V_{CC}$, and to a line 122 carrying the signal $C_X$ as an output of comparator 58 to latch 64.

Now, when write driver 52 switches, the voltage level of drive signal $H_X$ rises above the supply voltage $V_{CC}$, due to the inductive effects from inductance $L_{HEAD}$ 56. This causes transistor 110 to saturate and voltage levels of signals $C_X$ and $\overline{C_X}$, and the voltage at node N1, all to rise above $V_{CC}$. The large inputs of signals $C_X$ and $\overline{C_X}$ to latch 64 can cause latch 64 to be set to the wrong state during writing.

Therefore, it is desired to have a hard drive unit with open circuit fault detection that operates reliably at modem hard drive data write rates.

SUMMARY OF THE INVENTION

In accordance with the present invention, there is provided an open circuit detection circuit for a hard disk drive write head, wherein the write head receives write drive signals from a write driver, and wherein the write driver generates a write drive signal in response to write control signals. The circuit includes a pulse width detector, generating a latch control signal in response to the detection of a write control signal having a predetermined duration. The circuit also includes a comparator comparing the write drive signal to a predetermined reference level and generating a comparison output signal indicative of whether the write driver signal is more or less than the predetermined level. A latch is coupled to receive the comparison output signal, the latch being clocked in response to the latch control signals. The latch output provides an indication of an open circuit.

These and other features of the invention will be apparent to those skilled in the art from the following detailed description of the invention, taken together with the accompanying drawings.

DESCRIPTION OF THE PREFERRED EMBODIMENT

Figure 6:
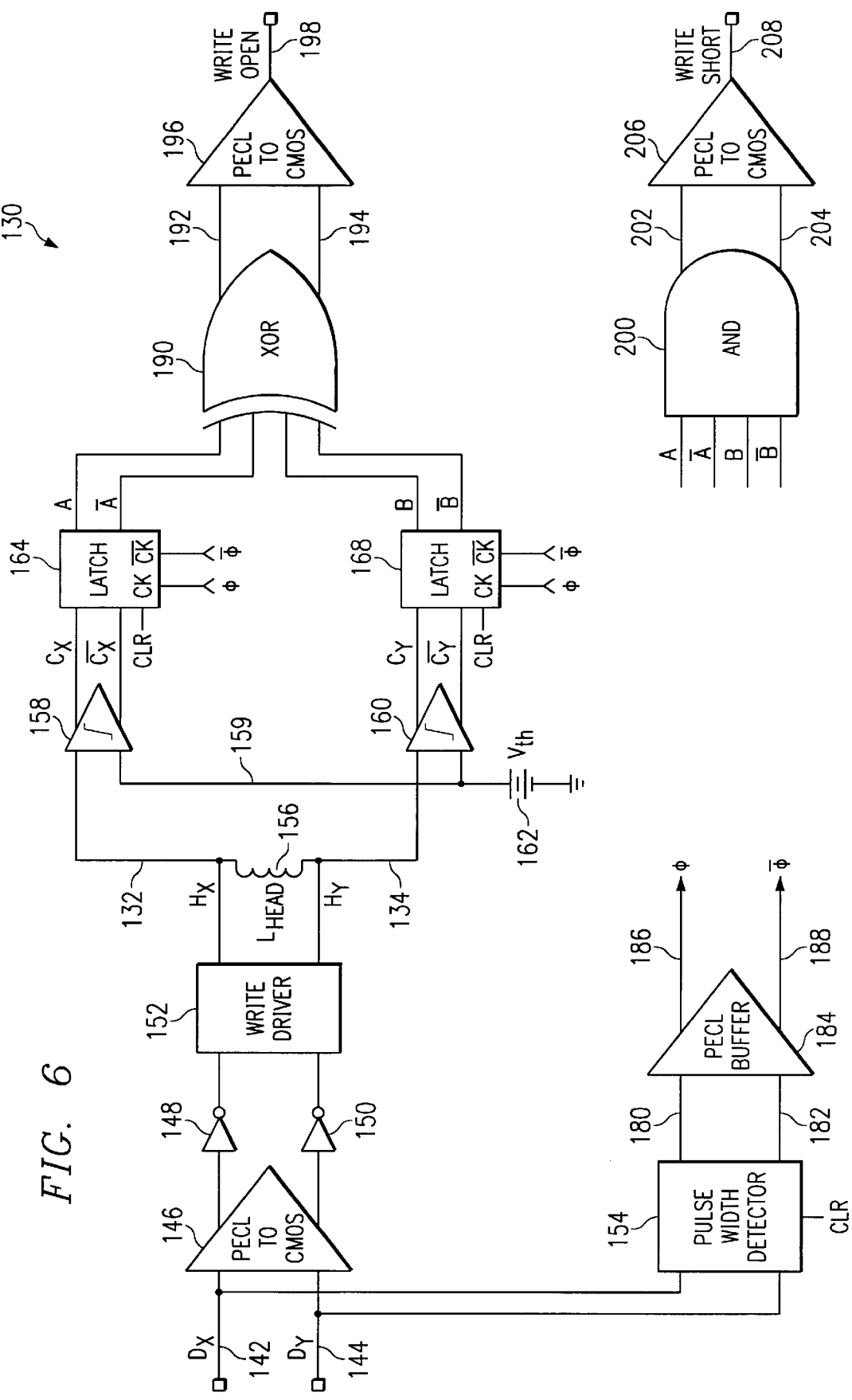
FIG. 6 is a logic diagram of a preferred embodiment of a fault detection circuit in accordance with the present invention.

FIG. 6 is a logic diagram of a write drive circuit 130 including a fault detection circuit in accordance with a preferred embodiment of the present invention. Similar to the circuit 30 of FIG. 2, differential write data signals $D_X$ and $D_Y$, at positive supply emitter coupled logic ("PECL") levels are provided on lines 142 and 144, respectively, and are converted to complementary metal oxide semiconductor ("CMOS") levels in converter 146. The resulting level-adjusted data signals are inverted by inverters 148 and 150, respectively, and the resulting inverted data signals are provided as inputs to a write driver 152. The write driver 152 has two output lines 132 and 134, carrying drive signals $H_X$ and $H_Y$, respectively. The hard drive head is connected between lines 132 and 134. As above, only the $L_{HEAD}$ inductance 156 is shown in FIG. 6.

Figure 1:
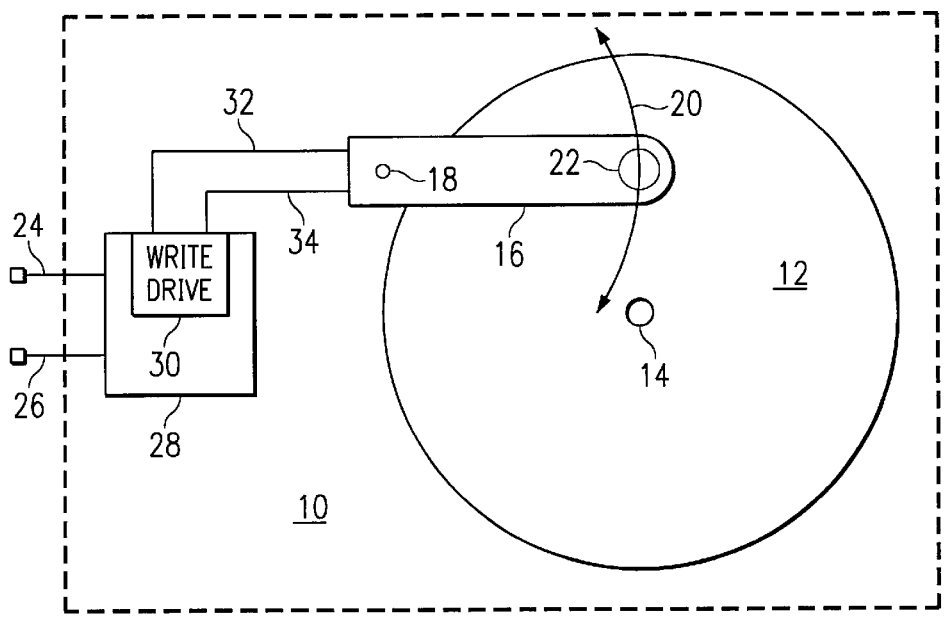
FIG. 1 is a high level diagram of a hard drive storage unit.
Figure 2:
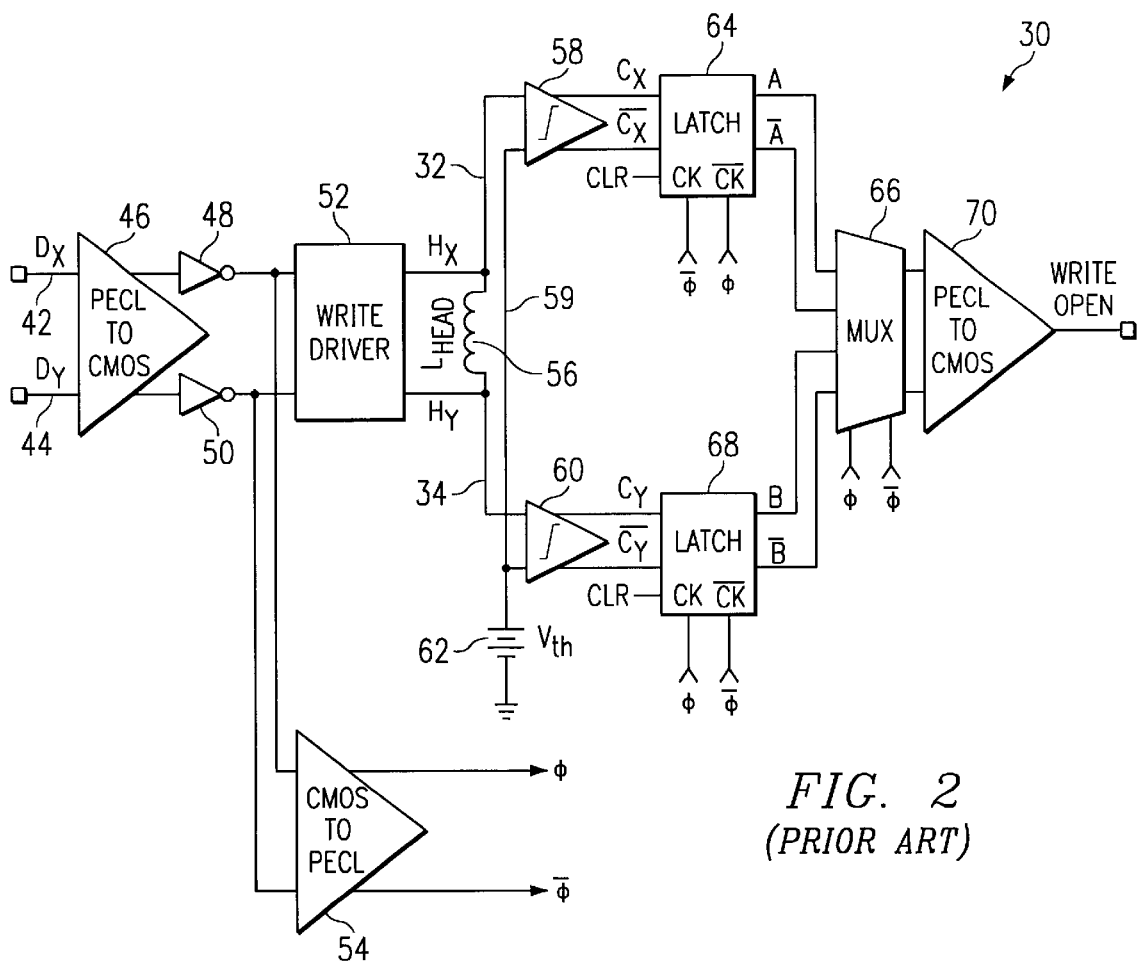
FIG. 2 is logic diagram of a prior art fault detection circuit for a hard drive storage unit write driver.
Figure 3:
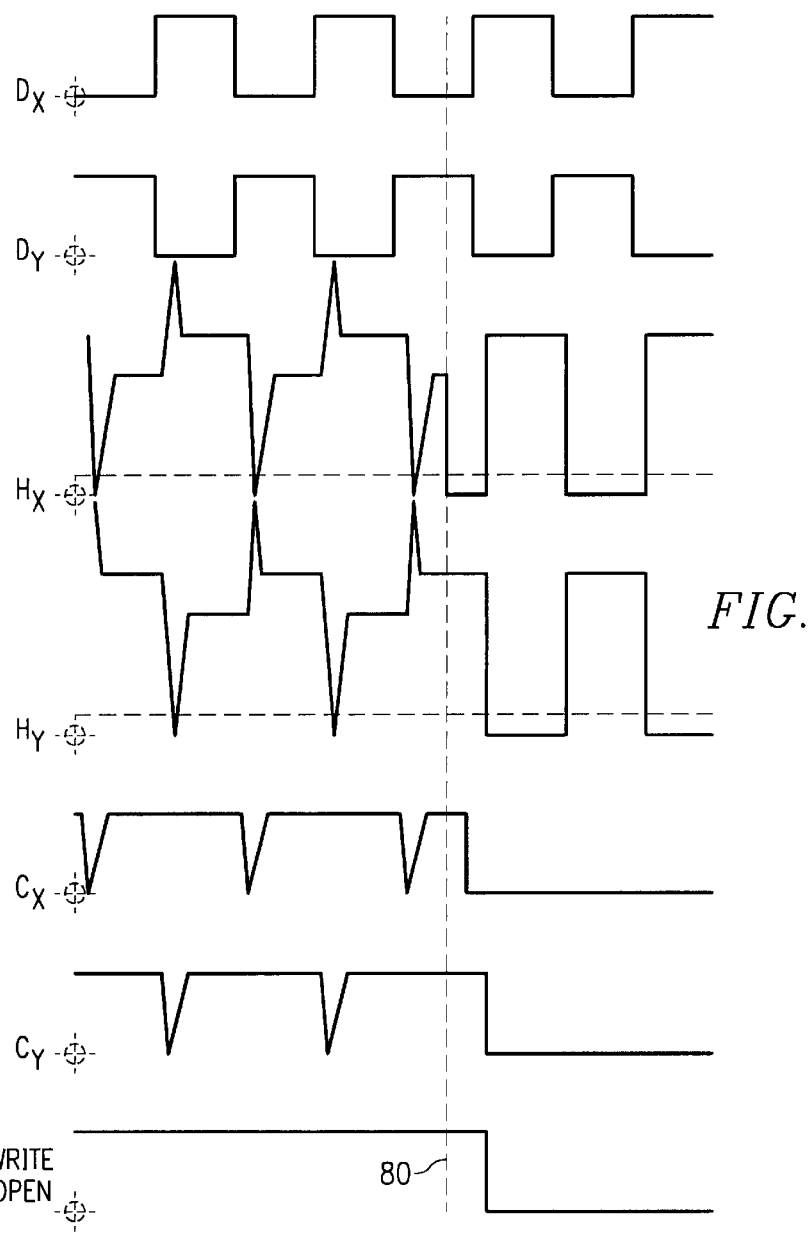
FIG. 3 is a timing diagram of certain signals appearing in the circuit shown in FIG. 2.
Figure 4:
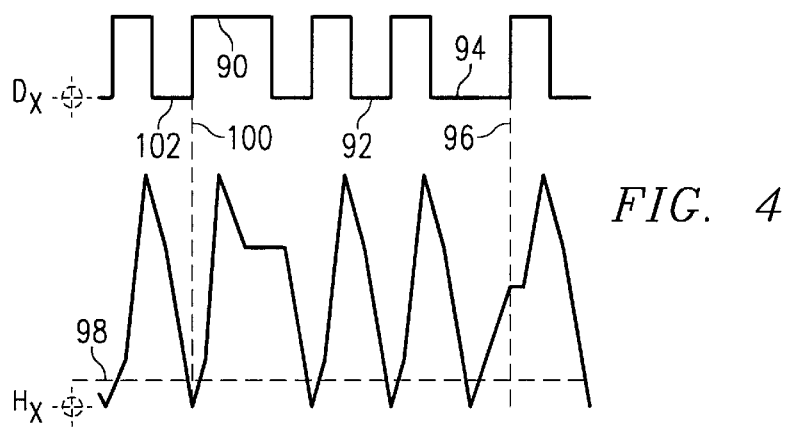
FIG. 4 is a timing diagram of certain signals appearing in the circuit shown in FIG. 2 when operating at modem write data rates.

Unlike the circuit of FIG. 2, the differential write data signals $D_X$ and $D_Y$ are also provided to a pulse width detector 154 having two differential output lines 180 and 182. The pulse width detector 154 outputs a set of differential pulses on lines 180 and 182 only if it detects a pulse, of either polarity, on line 142 or line 144 having a predetermined duration sufficiently long to ensure that the voltage level of the $H_{X, or HY}$, signal on line 132, or on line 134, has time to rebound from the effects of the $L_{HEAD}$ inductance 156. Since both inputs of the pulse width detector 154 are monitoring pulses of both polarities, and generating a pulse when an input pulse of the same predetermined duration is detected, both outputs are triggered when a pulse of sufficient duration is detected.

The differential outputs of the pulse width detector 154 are provided on lines 180 and 182 to a PECL buffer 184 where they are buffered. The PECL buffer 184 has two differential outputs, corresponding to input lines 180 and 182, respectively, and carrying control signals φ and $\bar{\phi}$, respectively, which are also at PECL level.

Similar to the circuit 30 in FIG. 2, line 132 is provided to one input of a first comparator 158, and line 134 is provided to one input of a second comparator 160. The other inputs of both comparators 158 and 160 are connected by a line 159 to the source 162 of a reference voltage $V_{th}$ used to set the thresholds of comparators 158 and 160.

The differential outputs of comparator 158, carrying signals $C_X$ and $\overline{C_X}$ are provided to the differential inputs of a latch 164. The differential clock inputs CK and $\overline{CK}$ of latch 164 receive control signals φ and $\bar{\phi}$, respectively. The differential outputs of latch 164, A and $\overline{A}$, are provided to two inputs of an XOR gate 190.

The differential outputs of comparator 160, carrying signals $C_Y$ and $\overline{C_Y}$, are provided to the differential inputs of a latch 168. The differential clock inputs CK and $\overline{CK}$ of latch 168 receive control signals φ and $\bar{\phi}$, respectively. The differential outputs of latch 168, B and $\overline{B}$, are provided to the other two inputs of XOR gate 190.

The out puts of XOR gate 190 are a pair differential signal lines 192, 194, provided to a PECL to CMOS converter 196, the output of which, on line 198, is a WRITE OPEN indication signal.

Additionally, the differential outputs of latch 164, A and $\overline{A}$, are provided to two inputs of an AND gate 200. Also, the differential outputs of latch 168, B and $\overline{B}$, are provided to the other two inputs of AND gate 200. The differential outputs of AND gate 200, on lines 202 and 204, are provided to a PECL to CMOS converter 206, the output of which, on line 208, is a WRITE SHORT indication signal.

In operation, as mentioned briefly above, excessively short pulses in both $D_X$ and $D_Y$ do not result in any output from pulse width detector 154. Therefore, in such situations no differential control pulses φ and $\bar{\phi}$ are output from PECL buffer 184, and whatever the contents of latches 164 and 168 are remains the same. The timing setting for pulse width discrimination is dependent upon the specifics of the hard drive system in which the present invention is to be employed, for example the value of $L_{HEAD}$, resistances, and the like, and should be set by the practitioner with the actual waveforms of $H_X$ and $H_Y$ in mind. In an actual embodiment a value of 25 nanoseconds was determined to be optimal, for example. Other timings will be optimal for different system parameters. Determination of such timing is well within the purview of those of ordinary skill in this art area, once the principles of the present invention, as set forth herein, are understood.

On the other hand, when a sufficiently long pulse of either polarity occurs in $D_X$ or in $D_Y$, i.e., greater than the pulse width detector timing setting, differential control pulses φ and $\bar{\phi}$ are generated. When these control signals are generated, latches 164 and 168 are clocked to latch the output of comparators 158 and 168, respectively. If the output of either latch 164 or latch 168 is high, indicating that one side of the write driver 152 output is pulled below $V_{th}$, the XOR gate 190 outputs a "one," indicating a fault. If the outputs of both latch 164 and latch 168 are high, which occurs when a short exists in the write driver 152 output, the XOR gate 190 outputs a "zero," indicating no fault. However, in that situation AND gate 200 outputs a "one," indicating that the write short has occurred.

It will thus be appreciated that the preferred embodiment just described includes write short indication in addition to write open indication, with the addition of only an AND gate and an additional PECL to CMOS converter.

Figure 5:
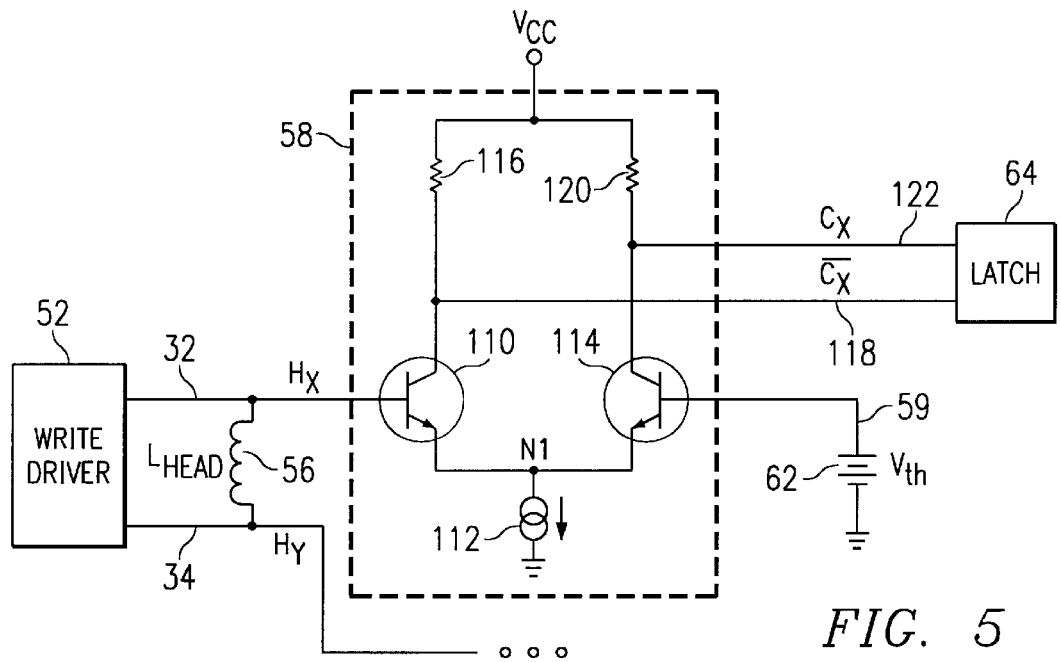
FIG. 5 is a circuit diagram of comparator 58 of FIG. 3.
Figure 7:
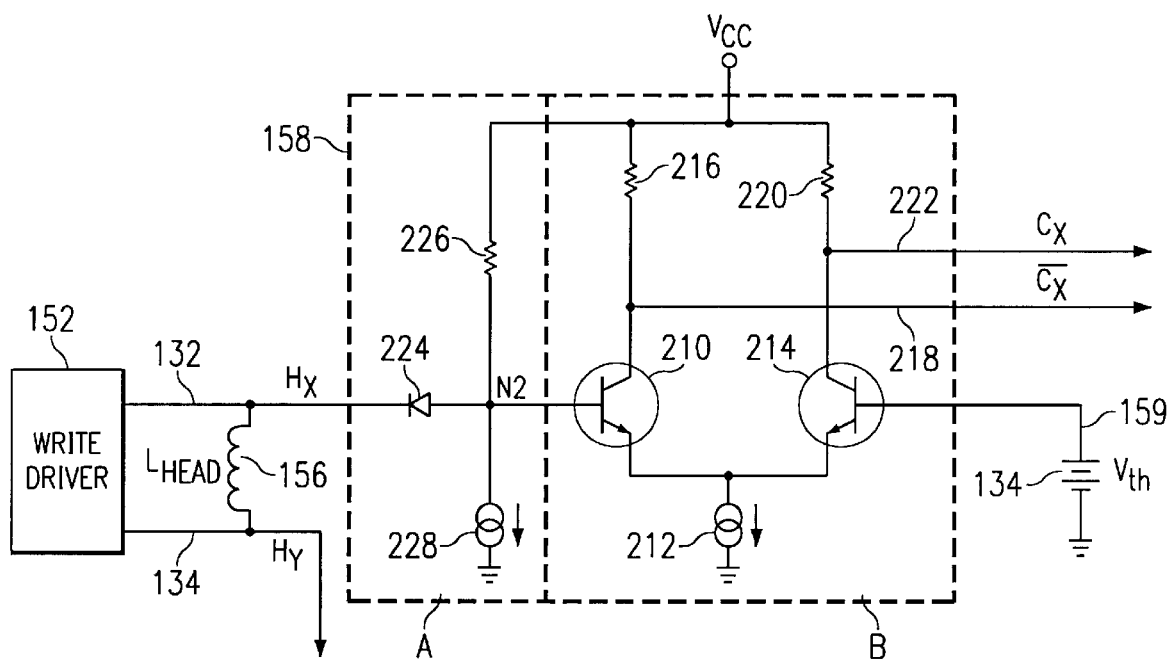
FIG. 7 is a circuit diagram of a preferred embodiment of an improved comparator circuit in accordance with the present invention.

Referring now to FIG. 7, there is shown a view similar to that of FIG. 5, but showing corresponding components from FIG. 6, rather than from FIG. 2. Additional circuitry in comparator 158 to that in comparator 58 is shown in FIG. 7. As can be seen, the output lines 132 and 134 from write driver 152 are coupled to $L_{HEAD}$ 156. Line 132 is also connected to comparator 158.

Comparator 158 has two parts, an A part and a B part, as shown. The B part of comparator 158 is of basically the same construction as that of comparator 58, shown in FIG. 5. The A part of comparator 158 contains additional circuitry that compensates for the excessive voltage swing on line 132 described above. It will be recalled from the principles described above in connection with FIG. 5, that when write driver 152 switches, the voltage level of drive signal $H_X$ rises above the supply voltage $V_{CC}$, due to the inductive effects from inductance $L_{HEAD}$ 156. This could cause transistor 210 to saturate and voltage levels of signals $C_X$ and $\overline{C_X}$, and the voltage at node N2, all to rise above $V_{CC}$. The large inputs of signals $C_X$ and $C_X$ on lines 222 and 218, respectively, could then potentially cause latch 164 (FIG. 6) to be set to the wrong state during writing.

However, this is prevented by the circuitry in part B of latch 158, which includes a diode 224 having its cathode connected to line 132 and having its anode connected to the base of transistor 210, and which includes a bias network comprising a resistor 226 connected between the base of transistor 210 and $V_{CC}$, and a current source 228 connected between the base of transistor 210 and ground. The common connection point of the base of transistor 210, diode 224, resistor 226 and current source 228 is labeled node N2.

The diode 224 and bias network of resistor 226 and current source 228 prevent the base of transistor 210 from being pulled excessively high, thus preventing the aforementioned undesirable latching of an incorrect state. In addition, the diode 224 allows the voltage at node N2 to be pulled down when the write driver 152 load becomes an open circuit, allowing the correct state to be latched to indicate the open circuit.

The value of resistor 226 and the magnitude of current source 228 are selected so as to set the voltage at node N2 above the voltage on line 159 by, typically, greater than 100 mV. In this regard, resistor 226 should be small enough to pull up node N2, given the parasitic capacitance seen at node N2, sufficiently quickly so as to settle the comparator during data transitions with a desired speed. The pulse width detector 154 (FIG. 6) timing should take into consideration the resulting time it takes for the comparator to settle. These tradeoffs are well within the purview of those of ordinary skill in this art area.

Although the present invention and its advantages have been described in detail, it should be understood that various changes, substitutions and alterations can be made herein without departing from the spirit and scope of the invention as defined by the appended claims.

What is claimed is:

1. A open circuit detection circuit for a hard disk drive write head, wherein said write head receives write drive signals from a write driver, and wherein said write driver generates a write drive signal in response to a write control signal, the open circuit detection circuit comprising:
   a pulse width detector, generating a latch control signal in response to the detection of one of said write control signals having a predetermined duration;
   a comparator comparing said write drive signal to a predetermined reference level and generating a comparison output signal indicative of whether said write driver signal is more or less than said predetermined level; and
   a latch coupled to receive said comparison output signal, said latch being clocked in response to said latch control signal.

2. A open circuit detection circuit for a hard disk drive write head, wherein said write head receives write drive signals from a write driver, and wherein said write driver generates a write drive signal in response to a write control signal, the open circuit detection circuit comprising:
   a pulse width detector, generating a latch control signal in response to the detection of at one of said write control signals having a predetermined duration;
   a comparator comparing said write drive signal to a predetermined reference level and generating a comparison output signal indicative of whether said write driver signal is more or less than said predetermined level; and a latch coupled to receive said comparison output signal, said latch being clocked in response to said latch control signals; and
   wherein said predetermined duration is set to be sufficiently long to allow said write drive signal to rise above said predetermined reference level during normal operation of said write drive, while allowing detection of a write drive signal below said predetermined reference level when a load on said write driver is an open circuit.

3. A open circuit detection circuit for a hard disk drive write head, wherein said write head receives write drive signals from a write driver, and wherein said write driver generates write drive signals in response to write control signals, the open circuit detection circuit comprising:
   a pulse width detector, generating latch control signals in response to the detection of at least one of said write control signals having a predetermined duration;
   a first comparator for comparing a first write driver output signal to a predetermined reference level and generating a first comparison output signal indicative of whether said first write driver output signal is more or less than said predetermined level;
   a first latch coupled to receive said first comparison output signal, said first latch being clocked in response to said latch control signals;
   a second comparator for comparing a second write driver output signal to a predetermined reference level and generating a second comparison output signal indicative of whether said second write driver output signal is more or less than said predetermined level;
   a second latch coupled to receive said second comparison output signal, said latch being clocked in response to said latch control signals; and
   an XOR gate receiving said first comparison output signal and said second comparison output signal as inputs.

4. A short circuit detection circuit for a hard disk drive write head, wherein said write head receives write drive signals from a write driver, and wherein said write driver generates write drive signals in response to write control signals, the short circuit detection circuit comprising:
   a pulse width detector, generating latch control signals in response to the detection of at least one of said write control signals having a predetermined duration;
   a first comparator for comparing a first write driver output signal to a predetermined reference level and generating a first comparison output signal indicative of whether said first write driver output signal is more or less than said predetermined level;
   a first latch coupled to receive said first comparison output signal, said first latch being clocked in response to said latch control signals;
   a second comparator for comparing a second write driver output signal to a predetermined reference level and generating a second comparison output signal indicative of whether said second write driver output signal is more or less than said predetermined level;
   a second latch coupled to receive said second comparison output signal, said latch being clocked in response to said latch control signals; and
   an AND gate receiving said first comparison output signal and said second comparison output signal as inputs.

5. A fault detection circuit for a hard disk drive write head, wherein said write head receives write drive signals from a write driver, and wherein said write driver generates write drive signals in response to write control signals, the fault detection circuit comprising:
   a pulse width detector, generating latch control signals in response to the detection of at least one said write control signals having a predetermined duration;
   a first comparator for comparing a first write driver output signal to a predetermined reference level and generating a first comparison output signal indicative of whether said first write driver output signal is more or less than said predetermined level;
   a first latch coupled to receive said first comparison output signal, said first latch being clocked in response to said latch control signals;
   a second comparator for comparing a second write driver output signal to a predetermined reference level and generating a second comparison output signal indicative of whether said second write driver output signal is more or less than said predetermined level;
   a second latch coupled to receive said second comparison output signal, said latch being clocked in response to said latch control signals;
   an XOR gate receiving said first comparison output signal and said second comparison output signal as inputs; and
   an AND gate receiving said first comparison output signal and said second comparison output signal as inputs.

6. A fault detection circuit for a hard disk drive write head, wherein said write head receives write drive signals from a write driver, and wherein said write driver generates a write drive signal in response to write control signals, the fault detection circuit comprising:
   a comparator comparing said write drive signal to a predetermined reference level and generating a comparison output signal indicative of whether said write driver signal is more or less than said predetermined level;

a compensation circuit disposed between said write driver and said comparator, said compensation circuit comprising
- a diode coupled between said write driver and said comparator, and
- a bias network coupled to said diode, comprising a resistor coupling one port of said diode to a voltage supply and a current source coupling said one port to ground; and a latch coupled to receive said comparison output signal, said latch being clocked in response to said latch control signals.

7. A hard drive storage unit including an open circuit detection circuit for a hard disk drive write head, comprising:

a storage medium;

a magnetic write head;

hard drive write circuitry including a write driver for generating a write drive signal in response to write control signals;

a pulse width detector, generating a latch control signal in response to the detection of one of said write control signals having a predetermined duration;

a comparator comparing said write drive signal to a predetermined reference level and generating a comparison output signal indicative of whether said write driver signal is more or less than said predetermined level; and a latch coupled to receive said comparison output signal, said latch being clocked in response to said latch control signal.

* * * * *